United States Patent [19]

Weber et al.

[11] Patent Number: 5,360,920
[45] Date of Patent: Nov. 1, 1994

[54] HYDROGENATION IN A PLATE HEAT EXCHANGER

[75] Inventors: Vicki L. Weber, Cincinnati; Joseph S. Boggs, Springdale; Richard M. King, Amberley Village, all of Ohio

[73] Assignee: The Procter & Gamble Company, Cincinnati, Ohio

[21] Appl. No.: 926,611

[22] Filed: Aug. 7, 1992

[51] Int. Cl.⁵ .................................................. C11C 3/12
[52] U.S. Cl. ........................................................ 554/144
[58] Field of Search .............................. 554/144, 141

[56] References Cited

U.S. PATENT DOCUMENTS

| | | | |
|---|---|---|---|
| 3,073,380 | 1/1963 | Palmason et al. | 159/49 |
| 3,634,471 | 1/1972 | Kehse | 260/409 |
| 3,732,266 | 5/1973 | Dudrow | 554/141 |
| 3,809,708 | 5/1974 | Minor | 260/409 |
| 4,584,139 | 4/1986 | Gray et al. | 260/409 |
| 4,847,016 | 6/1989 | Göbel | 554/144 |
| 4,871,485 | 10/1989 | Rivers, Jr. | 260/409 |
| 4,960,960 | 10/1990 | Harrison et al. | 554/141 |
| 4,973,430 | 11/1990 | Rivers, Jr. | 260/409 |
| 5,093,535 | 3/1992 | Harrison et al. | 554/141 |

FOREIGN PATENT DOCUMENTS

| | | | |
|---|---|---|---|
| 60-150825 | 8/1985 | Japan. | |
| 2-261897 | 10/1990 | Japan | C11C 3/12 |
| 1142505 | 2/1985 | U.S.S.R. | C11C 3/12 |

OTHER PUBLICATIONS

Chemical Engineers' Handbook; 5th Edition, (1973) Robert H. Perry/Cecil H. Chilton, Chapter 11, pp. 22-23.

*Primary Examiner*—José G. Dees
*Assistant Examiner*—Samuel Barts
*Attorney, Agent, or Firm*—Robert B. Aylor

[57] ABSTRACT

Fatty materials are hydrogenated in a plate heat exchanger at a pressure above about 150 psig. The use of high pressure and high shear as provided by the appropriate surface to volume ratio and pressure drop in the heat exchanger, enables the fatty material to be efficiently hydrogenated, and for touch hardening the temperature can be reduced to minimize the formation of trans-isomers.

15 Claims, No Drawings

HYDROGENATION IN A PLATE HEAT EXCHANGER

BACKGROUND OF THE INVENTION

1. Field of the Invention

This invention relates to hydrogenation of fatty materials in a plate heat exchanger. Specifically, it relates to processes for lightly hydrogenating unsaturated fatty materials like fatty acids, fatty esters, etc., while maintaining a favorable trans-/cis-isomer ratio and/or hydrogenating to a very low Iodine Value.

2. Description of Related Art

Hydrogenation of fatty materials is well known, having been described in U.S. Pat. Nos.: 3,073,380, Palmason; 3,634,471, Kehse; 3,809,708, Minor; 4,584,139, Gray et al.; and 4,871,485, Rivers; Japanese Pat. Appln. 02/261,897; and Soviet Union Appln. 1,142,505. The use of a plate and frame heat exchanger for hydrogenation is disclosed in U.S. Pat. No. 3,809,708. All of said patents and patent applications are incorporated herein by reference.

SUMMARY OF THE INVENTION

This invention relates to a process for hydrogenating unsaturated fatty acids and/or their esters in a heat exchanger of the type generally referred to as a "plate" heat exchanger, preferably one that has a solid outer shell construction, e.g., welded, so as to provide a vessel which can withstand high pressures, e.g., more than about 150 psig, the vessel having an internal configuration to provide high shear mixing under normal flow rates, and the process being run under a pressure of more than about 150 psig, preferably from about 150 to about 500 psig, more preferably from about 300 to about 400 psig, the combination of high shear mixing and high pressure being sufficient to effect essentially complete reaction of the hydrogen used in the process, so that the amount of hydrogen used determines the degree of hydrogenation and the temperature can be lowered during "touch hardening" to avoid formation of the trans- isomer.

DESCRIPTION OF THE PREFERRED EMBODIMENTS

The present invention improves the existing art processes by increasing the pressure and/or shear used in the hydrogenation of fatty materials (also referred to herein as "fatty reactants" and/or "feedstock") while maintaining the advantage of superior temperature control that a plate heat exchanger provides. The common heat exchangers, of the type used in U.S. Pat. No. 3,809,708, are not suitable for optimum use, since they rely upon compression and a series of seals to maintain pressure. Preferably the heat exchanger is one that has a solid outer shell, e.g., one like those sold by Packnox of Louveciennes, France under the trade name Packinox, and by Karbate Vicarb, Inc. under the trade name Compabloc, the said heat exchangers being modified to have ratios of surface area to volume (S/V) of at least about 75, preferably from about 75 to about 300, more preferably from about 150 to about 300. The heat exchanger should have the ability to operate continuously and safely under a pressure of from about 150 to about 500 psig, preferably from about 300 to about 500 psig, more preferably from about 300 to about 400 psig. The higher pressures of hydrogen are preferred to maximize the amount of hydrogen that is dissolved in the fatty reactants, especially under conditions of low temperature.

The plate heat exchanger (hydrogenation reactor), may have inlets for the hydrogen gas at more than one place to allow introduction of the hydrogen gas as the dissolved gas is used up. This permits the reaction to continue without the necessity of having excess gas present in the initial stages when it would be present as a gas and interrupt the transfer of heat. This is desirable when one is interested in fully hydrogenating a feedstock. The heat exchanger is primarily used to remove heat as it is produced by the reaction and thereby maintain conditions where a minimum of undesirable by-products are formed and/or minimal conversion of cis- to trans- isomers occurs. Isomer conversion is increased by high temperature and slow reactions.

The heat exchanger should have the capability of removing the heat of the reaction as it occurs to maintain the temperature within the range of from about 120° to about 240° C., preferably from about 120° to about 180° C., more preferably from about 120° to about 150° C. This temperature range is optimum for slightly reducing the Iodine Value (IV) of the fatty reactant while minimizing formation of the trans-isomer of unsaturated fatty acids. It is recognized that when the IV is lowered to very low levels, there is very little unsaturation and therefore less need to be concerned about isomers.

The heat exchanger, in operation, should provide high shear stress, which is directly related to pressure drop per unit of the flow path length. Preferably, the pressure drop per unit length is from about 0.2 to about 2.0 psig/ft., more preferably from about 0.5 to about 1 psig/ft.

The combination of high pressure, high shear, and/or low temperature provide fast hydrogenation at mild conditions, e.g., a combination of time and temperature, that permit one to provide high production rates and/or hydrogenated fatty materials that have excellent color, heat stability, and/or odor, even for materials that are almost fully, or fully, hydrogenated.

Preferred reactors herein are those which have: a solid outer shell; an internal structure that mimimizes by-passing of the plates; the cabability of maintaining an internal pressure during the reaction of from about 150 to about 500 psig, preferably from about 300 to about 500 psig; a ratio of internal surface to internal volume (S/V) of from about 75 to about 300, preferably from about 150 to about 300, more preferably from about 200 to about 300; and are fabricated from material that is resistant to becoming brittle when in contact with hydrogen and/or the fatty reactant, as defined hereinafter.

Fatty Reactants

The fatty reactants include any of the fatty acids containing unsaturation. Typically, the fatty acids contain from about 8 to about 26 carbon atoms, preferably from about 14 to about 22 carbon atoms, more preferably from about 16 to about 18 carbon atoms. The fatty reactants also include the esters of the above fatty acids, e.g., their methyl and ethyl esters and the mono-, di-, and tri- glycerides, and monohydroxy alcohols containing from about 8 to about 24, preferably from about 14 to about 22 carbon atoms. The most preferred fatty reactants are the methyl esters.

The fatty acids that can be hydrogenated include: soybean, palm oil, erucic, canola, coconut, palm oil stearine, tallow, etc. The corresponding methyl esters are also desirable reactants.

Additional fatty reactants include the corresponding ethyl esters and the corresponding mono-, di-, and triglycerides.

The IV of the starting fatty material is typically at least about 5, preferably at least about 30, and typically from about 30 to about 150, preferably from about 30 to about 120. The IV is typically lowered by from about 2 to about 15, preferably from about 5 to about 10 for "touch hardening" and to less than about 2, preferably less than about 1, for complete hardening. When the fatty material is touch hardened, the trans-isomers are preferably increased by less than about 15%, more preferably less than about 5%.

Hydrogen

The hydrogen gas that is used in the reaction should be free from any contaminants that will interfere with the reaction. Specifically the hydrogen should be free of moisture. It is desirable to use as little as possible of the hydrogen gas to minimize separation and to maximize safety. Since the reaction herein is so efficient, the excess of hydrogen over the desired level of hydrogenation is typically no more than about 25%, preferably no more than about 10%, more preferably no more than about 5%.

The Catalyst

Any of the normal hydrogenation catalysts can be used. The catalyst can be, and typically is used in finely divided form, preferably having a particle size of from about 0.5 to about 20 microns, preferably from about 1 to about 10 microns, more preferably from about 4 to about 5 microns. The small catalyst size is preferred since the catalyst is suspended in the fatty reactant and the smaller sizes are more stably suspended.

The catalysts include the nickel catalysts, typically Raney nickel catalysts, either supported, or not supported. Other catalysts include platinum and palladium catalysts, again, either supported, or not supported. The catalyst can be either recycled, or not, as the process proceeds. Preferred catalysts include: nickel, copper, palladium, platinum, and cobalt catalysts. Mixtures of the above, catalysts can also be used.

The level of the catalyst can be kept low, typically from about 0.05% to about 1%, preferably from about 0.02% to about 0.5%.

In the following Examples, and in the specification, all percentages, parts, and ratios are by weight and all figures are approximations unless otherwise specified.

EXAMPLES

In the following runs, the plate and frame heat exchangers have the following physical dimensions:

| Plate and Frame Heat Exchangers | | | | |
|---|---|---|---|---|
| | Runs 1-6 | Runs 7-8 | Run 9 | Run 10 |
| Plate Heat Exchanger Type | Gasketed | Welded | Welded | Gasketed |
| No. of Process Channels | 24 | 8 | 100 | 100 |
| No. of Channels/Pass | 1 | 8 | 2 | 2 |
| Plate Gap (mm) | 2.4 | 2.5 | 5.0 | 3.0 |
| Plate Width (mm) | 102 | 102 | 200 | 326 |
| Plate Length (mm) | 357 | 10668 | 200 | 945 |
| Chevron Angle | 60 | 60 | 45 | 60 |

| Plate and Frame Heat Exchangers (continued) | | | | |
|---|---|---|---|---|
| | Runs 1-6 | Runs 7-8 | Run 9 | Run 10 |
| (from vertical) | | | | |

The fatty reactants in the runs are tallow fatty acids which have the following initial Iodine Values and trans fatty acid contents.

| | Runs 1-4 | Runs 5-6 | Runs 7-10 |
|---|---|---|---|
| Iodine Value | 52.2 | 52.0 | 48.3 |
| Trans Acids | 5.1 | 3.8 | 4.5 |

The operating conditions and results in the runs are as follows:

| Operating Conditions and Results | | | | |
|---|---|---|---|---|
| Run | Temp. (°F.) | Pressure* (psig) | FA Flow (lb/hr) | $H_2$ Flow (lb/hr) |
| 1 | 430 | 75 | 60 | .095 |
| 2 | 430 | 75 | 60 | .068 |
| 3 | 340 | 80 | 60 | .095 |
| 4 | 340 | 75 | 60 | .055 |
| 5 | 295 | 150 | 60 | .050 |
| 6 | 295 | 150 | 60 | .025 |
| 7 | 250 | 250 | 1000 | 1.43 |
| 8 | 415 | 250 | 700 | 3.27 |
| 9 | 415 | 250 | 1300 | 6.19 |
| 10 | 410 | 150 | 700 | 3.63 |

| Run | Ni (Wt. %) | Iodine Value | % Trans Acids |
|---|---|---|---|
| 1 | .05 | 39.4 | 20.0 |
| 2 | .30 | 41.6 | 16.0 |
| 3 | .50 | 38.4 | 13.1 |
| 4 | .10 | 45.4 | 10.5 |
| 5 | .05 | 48.8 | 7.6 |
| 6 | .05 | 45.0 | 8.0 |
| 7 | .10 | 37.1 | 6.7 |
| 8 | .15 | 1.8 | — |
| 9 | .15 | 5.0 | — |
| 10 | .15 | 2.3 | — |

*Inlet Pressure

As can be seen from the above, low levels of catalyst can be used (1 vs. 2 or 3) with essentially equivalent results. Also, the use of lower temperatures and higher pressures (1-4 vs. 5-7) reduces trans- fatty acid content while still reducing the Iodine Value. It is also seen that the output can be increased by simply increasing the reactant throughputs and reactor size (6 vs. 7) and that the level of hydrogenation can be increased by simply increasing the amount of hydrogen relative to the fatty reactant (3 vs. 4 and 7 vs. 8-10). These results could not have been predicted in advance.

What is claimed is:

1. The process of hydrogenating a fatty material in a plate and frame heat exchanger having a ratio of surface to volume of at least about 75 at a pressure of at least 150 psig, the pressure drop per foot being at least about 0.2 psig.

2. The process of claim 1 wherein said ratio of surface to volume is from about 75 to about 300, said pressure is from about 150 psig to about 500 psig, said pressure drop per foot is from about 0.2 to about 2 psig, and wherein the temperature is maintained within from about 120° C. to about 240° C.

3. The process of claim 2 wherein said temperature is from about 120° C. to about 180° C.

4. The process of claim 3 wherein said temperature is from about 120° C. to about 150° C.

5. The process of claim 2 wherein said pressure is from about 300 psig to about 400 psig.

6. The process of claim 5 wherein said ratio of surface to volume is from about 150 to about 300.

7. The process of claim 6 wherein said temperature is from about 120° C. to about 180° C.

8. The process of claim 7 wherein said temperature is from about 120° C. to about 150° C.

9. The process of claim 6 wherein said pressure drop per foot is from about 0.5 to about 1 psig.

10. The process of claim 2 wherein said fatty material is selected from the group consisting of:
   A. Fatty acids containing from about 8 to about 26 carbon atoms and having an Iodine Value of more than about 5;
   B. Esters of said fatty acids; and
   C. Fatty alcohols containing from about 8 to about 24 carbon atoms and having an Iodine Value of more than about 5.

11. The process of claim 10 wherein said Iodine Value is reduced by at least about 5 while increasing the percentage of trans-isomers by no more than about 15% of the original value.

12. The process of claim 11 wherein said fatty material is a methyl ester of said fatty acids.

13. The process of claim 1 wherein said fatty material is a fatty acid.

14. The process of claim 10 wherein the Iodine Value of said fatty material is reduced to less than about 2.

15. The process of claim 2 wherein said heat exchanger has a solid shell.

* * * * *